(12) United States Patent
Leitl (10) Patent No.: US 12,384,527 B2
(45) Date of Patent: Aug. 12, 2025

(54) METHOD FOR PRODUCING AN OBJECT PROVIDED WITH RIBLETS ON AND/OR IN THE SURFACE, AND OBJECT PRODUCED THEREBY

(71) Applicant: Peter Leitl, Graz (AT)

(72) Inventor: Peter Leitl, Graz (AT)

( * ) Notice: Subject to any disclaimer, the term of this patent is extended or adjusted under 35 U.S.C. 154(b) by 8 days.

(21) Appl. No.: 17/792,485

(22) PCT Filed: Dec. 14, 2020

(86) PCT No.: PCT/AT2020/060460
§ 371 (c)(1),
(2) Date: Jul. 13, 2022

(87) PCT Pub. No.: WO2021/142496
PCT Pub. Date: Jul. 22, 2021

(65) Prior Publication Data
US 2023/0054708 A1 Feb. 23, 2023

(30) Foreign Application Priority Data
Jan. 14, 2020 (AT) .............................. A 50021/2020

(51) Int. Cl.
*B64C 21/10* (2006.01)
*F15D 1/00* (2006.01)
*F15D 1/12* (2006.01)

(52) U.S. Cl.
CPC ............ *B64C 21/10* (2013.01); *F15D 1/0035* (2013.01); *F15D 1/12* (2013.01); *B64C 2230/26* (2013.01)

(58) Field of Classification Search
CPC ... B64C 21/10; B64C 2230/26; F15D 1/0035; F15D 1/12; Y02T 50/10; B32B 3/30
See application file for complete search history.

(56) References Cited

U.S. PATENT DOCUMENTS

| 4,706,910 A | 11/1987 | Walsh et al. |
| 4,932,612 A | 6/1990 | Blackwelder et al. |

(Continued)

FOREIGN PATENT DOCUMENTS

| DE | 36 09 541 A1 | 9/1987 |
| DE | 44 42 319 C1 | 5/1996 |

(Continued)

OTHER PUBLICATIONS

International Search Report issued in International Patent Application No. PCT/AT2020/060460, dated Feb. 17, 2021, along with an English translation thereof.

(Continued)

*Primary Examiner* — Medhat Badawi
(74) *Attorney, Agent, or Firm* — GREENBLUM & BERNSTEIN, P.L.C.

(57) ABSTRACT

A method for producing an object with riblets on and/or in the surface, around which object a fluid flows during use. A frictional resistance acting on a surface region along a flow direction during a flow around the object in the fluid is calculated and added up to a cumulative frictional resistance over a length of the surface region in the flow direction, after which the riblets are provided on and/or in a partial region of the surface in which an increase in the cumulative frictional resistance is at least 0.9, in particular greater than 1.0 to 0.9. Moreover, a method is provided for modifying a surface of an object around which a fluid flows during use, such as a foil. A structure having riblets is created on and/or in the surface, which structure reduces flow resistance of the object. Furthermore, a fluid flows around an object during use.

21 Claims, 10 Drawing Sheets

(56) References Cited

U.S. PATENT DOCUMENTS

| | | | |
|---|---|---|---|
| 5,890,681 | A | 4/1999 | Meng |
| 6,345,791 | B1 * | 2/2002 | McClure ................ B64C 21/10 |
| | | | 244/130 |
| 6,516,652 | B1 | 2/2003 | May et al. |
| 2008/0061192 | A1 | 3/2008 | Sullivan |
| 2010/0250205 | A1 | 9/2010 | Velazquez Lopez et al. |
| 2010/0280802 | A1 | 11/2010 | Calmels |
| 2012/0232860 | A1 | 9/2012 | Rodriguez et al. |
| 2014/0130318 | A1 | 5/2014 | Rohr et al. |
| 2019/0023379 | A1 * | 1/2019 | Okabayashi ............ F15D 1/004 |
| 2019/0118419 | A1 * | 4/2019 | Pricone ................ F03D 1/0641 |
| 2019/0186271 | A1 * | 6/2019 | Xu .......................... F01D 5/142 |

FOREIGN PATENT DOCUMENTS

| | | |
|---|---|---|
| DE | 10 2011 106 763 A1 | 1/2013 |
| DE | 10-2017-201-782 A1 | 8/2018 |
| EP | 2 261 117 B1 | 12/2018 |
| JP | 2005008080 A | 1/2005 |
| JP | 2017-155882 A | 9/2017 |

OTHER PUBLICATIONS

Written Opinion of the International Searching Authority issued in International Patent Application No. PCT/AT2020/060460, dated Feb. 17, 2021.
Search Report of the Austrian Patent Office Application No. A 50021/2020, dated Feb. 8, 2021.
Office action, with English language translation, from Japanese Patent Application No. 2022-541695, cited JP 2017-155882-A on Jul. 30, 2024.

* cited by examiner

METHOD FOR PRODUCING AN OBJECT PROVIDED WITH RIBLETS ON AND/OR IN THE SURFACE, AND OBJECT PRODUCED THEREBY

BACKGROUND

1. Field of the Invention

The invention relates to a method for producing an object provided with riblets on and/or in the surface, around which object a fluid flows during use.

The invention furthermore relates to an object produced in a corresponding manner.

Moreover, the invention relates to a method for modifying a surface of an object around which a fluid flows during use, such as a fa, wherein a structure having riblets is created on and/or in the surface, which structure reduces a flow resistance of the object.

Finally, the invention relates to an object around which a fluid flows during use, in particular foils, such as airfoils of an aircraft.

2. Description of the Background

When objects move in a fluid, namely a gas or a liquid, a laminar or turbulent flow in the near-surface regions of the object occurs on a surface of the moving object that is in contact with the fluid. The same thing applies in reverse when it is not the object, but rather the fluid that moves in or around the, in this case stationary, object. A simultaneous movement of the object and fluid is also possible. Whereas a laminar flow causes a comparatively low frictional resistance between the fluid and object, a turbulent flow in the near-surface region of the object results in a frictional resistance being increased.

When an object moves or is moved in a fluid or, conversely, the fluid flows around the object or therein, a high degree of frictional resistance is normally undesirable, since this resistance leads to an increased fuel consumption, for example in the case of aircraft. This applies analogously to other applications in which objects or portions of objects are moved in a fluid or the fluid flows around objects or portions of objects when the object is at a standstill. This concerns, for example, wind turbines with rotor blades which move in air or, as an example of the case of a stationary object, pipes through which a fluid flows. In each case, a higher frictional resistance appears to be disadvantageous in so far as more work must be expended to achieve a result than would be the case with a reduced frictional resistance.

In aviation in particular, attempts have been made in recent years to reduce a frictional resistance of aircraft, or at least portions thereof such as airfoils or fuselages, in order to thereby reduce the need for fuel. Used for this purpose are the observations from nature, now known for decades, according to which sharks have surface structures that reduce a frictional resistance during movement in water. The skin of sharks has a structured surface which comprises what are referred to as riblets on the outer skin. On sharks, these riblets are normally short, longitudinally extended profiles with a certain height and a certain width, as well as a certain length and a specific arrangement pattern. These riblets ensure that a turbulent flow in the near-surface region of a skin of a shark is prevented, or at least reduced, so that there is also a less turbulent flow, and a flow which therefore increases a frictional resistance to less of an extent, in this region. Corresponding findings from biology were subsequently applied to mechanical systems such as aircraft, pipes, or other application cases in that surfaces around which flows occur were equipped with similar riblets.

At the present time, the application of riblets the aviation industry appears to be becoming by far the most successful application, namely because, from the current perspective, a cost savings in aviation would constitute far and away the largest benefit. Also from an environmental protection standpoint, a sustained application of riblets in the aviation industry or on aircraft would be sustainable, especially since it has been shown in theoretical studies that up to 4% of a fuel expenditure could be saved in the aviation industry, or during operation of an aircraft, where riblets are designed with corresponding effectiveness.

Aircraft, for example, can be equipped with riblets by means of corresponding films that occur on an external surface that is adjacent to the fluid during use. It is likewise possible that an object, for example a pipe, is directly embodied with a corresponding structure. In the case of a pipe, a corresponding structure would be located on the inside, since a fluid flows around the inside structure or the clear diameter of the pipe.

A plane area or a pipe constitute very simple application cases for riblets, regardless of Whether the riblets are subsequently attached with a film having a corresponding riblet structure, for example, or are provided directly, in particular if the object is extruded, stamped, or otherwise embodied with corresponding structures in a forming step, as can be provided within the scope of the invention, as will be explained below. It is thereby problematic, however, that the outer structure of an aircraft, as is also the case for a natural object such as a shark, varies in cross section. This means that it is extremely difficult to reduce a frictional resistance by attaching a large amount of riblets in an economical manner. For aircraft, this is due to the fact that the production of corresponding films is very costly. The design and production of the films can thus exceed the expected benefit during operation of an aircraft, which, naturally, makes the design and attachment of corresponding films obsolete.

SUMMARY

The object of the invention is to create a solution suitable for this purpose, which solution makes it possible for a reduction, adequate in practice, of the frictional resistance of an object around which a fluid flows relatively to be created at a reasonable cost.

This object is attained in a first variant in that, with a method of the type named at the outset, a frictional resistance acting on a surface region along a flow direction during a flow around the object in a fluid is calculated and added up to a cumulative frictional resistance over a length of the surface region in the flow direction, after which the riblets are provided on and/or in a partial region of the surface in which an increase in the cumulative frictional resistance is at least 0.9, in particular greater than 1.0 to 0.9.

In the course of the invention, it was found that, for application cases for the purpose of reducing a frictional resistance, it is or can be sufficient if not an entire area of an object around which a flow occurs is designed with riblets, but rather only those regions in which a cumulative frictional resistance reaches a certain minimum value. Particularly in the case of foil profiles, for example, it has been shown that an arrangement of riblets on and/or in the surface of the object in a specific partial region is already fully sufficient to achieve an extensive reduction of the frictional resistance. Of course, the other partial regions of the profile not covered by riblets may still be subject to a turbulent flow; however, with a suitable design, these partial regions are simply less relevant. Although these partial regions can in principle also be optimized, this is not necessary. Overall, then, there emerges the view that, particularly with a single riblet structure that is affixed in suitable regions of an object such as a foil, an adequate percentage-wise reduction of the frictional resistance can be achieved. As a result, corresponding objects can be produced in such a manner, or films or other components that are to be applied can be produced which are attached to the objects. In the case of stationary objects around which a flow occurs, this applies analogously. All in all, with a method according to the invention, there results, in terms of a material cost, a disproportionately good reduction of a frictional resistance and also a cost savings, as less material is needed.

The partial regions in which an increase in the cumulative frictional resistance is greater than 1.0 to 0.9, for example, are preferably provided in a continuous manner. This means that, in regions which act outside of this range of values, riblet structures are not present, but rather only in the noted partial regions, and there in an area-wide or at least essentially area-wide manner. If multiple partial regions are present with corresponding conditions, it can be provided that regions covered with riblets alternate with uncovered regions, wherein a coverage is provided only in those regions that also meet the outlined conditions.

In accordance with the preceding statements, within the scope of the invention it does not matter whether an object moves in a fluid or is moved in the fluid, or whether the object is at a standstill and the fluid moves around the object. The concept according to the invention can thus be applied in all cases of relative motion, that is, where the object moves in the fluid, but also where the object is at a standstill and the fluid moves in or around the object. The former is the case, for example, when an aircraft or a foil moves in a medium such as air or water; the latter when a fluid flows around the object, for example a pipe structured in the interior.

The frictional resistance acting along the flow direction can in principle be calculated in any desired manner. In particular, it can be provided that this frictional resistance is calculated at certain points. A continuous calculation of the frictional resistance is also possible, however.

In the case of a profile such as a foil, but also other profiles, a frictional resistance can be present differently transversely to the axis of a flow. In this sense, it can be necessary, when calculating a minimization of the frictional resistance by riblets, to proceed such that a mean across multiple calculations is used. In particular, it can be provided that the frictional resistance acting along the flow direction is calculated at multiple points in a plane transverse to the flow direction, particularly points lying along a straight line in a plane transverse to the flow direction, after which the cumulative frictional resistance is added up from the frictional resistances calculated in such a manner. This means that the mean is taken across multiple points of the profile, so that an optimization is created in this regard. Of course, optimized conditions could be determined for each individual point of such a cross section, which would, however, necessitate a production of a plurality of films or, if a direct stamping or other type of shaping of the riblets occurs directly in the object, which is certainly not desired. Instead, a result with an optimized technical effect is to be achieved in a single process.

For certain objects that move in fluids, it can be pertinent that a region of the surface beginning downstream remains disregarded in the calculation. In particular, this can follow from the fact that a laminar flow is present in these regions anyway.

If this is provided, the region of the surface that begins downstream and is omitted should account for maximally 20%, preferably maximally 15%, in particular maximally 10%, of the total area of the surface. Analogous percentages apply if the corresponding omission relates not to the portion of the surface, but rather to the longitudinal extension of the object in the flow direction.

The riblets, which are affixed, adhesively bonded, shaped, or provided in any other manner according to the method of the invention, can be provided in a range of 20% to 90%, preferably 25% to 85%, in particular 30% to 80%, of the longitudinal extension of the surface in the flow direction. It is particularly preferred that the riblets are provided in a range of 20% to 90%, preferably 25% to 85%, in particular 30% to 80%, such as 25% to 65% for example, of the longitudinal extension of the surface in the flow direction. The less area that must be equipped with riblets, the less material is required.

In accordance with the preceding statements, it is preferably provided within the scope of the invention that the riblets are provided or applied only in a partial region of the surface.

Application means that the riblets are provided either directly on the surface, for example by means of stamping, by extruding, or in another manner, or are subsequently affixed to the surface indirectly, in particular by means of a film which bears the riblets or in which the riblets have been shaped. In principle, any desired type of a direct or indirect forming of structures for the embodiment of the riblets is suitable, wherein the forming can also first take place in a separate step, after which a component constructed in such a manner is attached to the surface being applied. The surfaces can be of any desired nature, hut are in principle chosen such that the desired effect materializes. Corresponding structures concern, in particular, partial regions of objects that are moved in a fluid, for example airfoils or fuselages of aircraft; rotor blades, in particular those of wind turbines; pipes; or all other objects Which are in contact with a fluid and involve relative movement between the object and fluid and wherein a reduction of a frictional resistance on the surface of the Object is desired. This can, for example, also include automobiles or sports equipment such as surfboards, bicycles, or skis for instance, but also professional sports clothing or the like.

As mentioned, a shaping of the riblets can occur directly on the object or in partial regions of a surface of an object. It is particularly preferable, however, if it is provided that the object is a, in particular bendable, film that is used correspondingly. If a corresponding film is produced, it is possible to retrofit already existing objects such as aircraft, for example. This is particularly advantageous where, as is the case with aircraft, a particularly long service life of an object is present. Thus, with the concept according to the invention, existing objects such as aircraft can be adapted at a later point in time while achieving the desired effect, in this case a fuel reduction.

If a film is provided, the film can be suitably designed using a numerical calculation, in particular according to the finite-volume method (computational fluid dynamics, CFD). An actual production of a film can take place, for example, by stamping, extrusion, welding, or in a different manner. Preferably, the film is thereby supplied by the yard, so that the film can be cut to length such that it is suitable for use, which enables a quick attachment or a quick retrofitting.

In accordance with the advantages stated above and the preferred application, it can in particular be provided that a foil is used as an object.

In a further aspect, the invention provides an object that is obtainable by a method according to the invention.

One advantage attained with a corresponding object is that an optimization of the desired effect is achieved with a simultaneous minimization of the necessary adaptation of an object. The conflict of objectives, according to which extraordinarily high expenditures must be made for an effective reduction of the frictional resistance, is thus satisfactorily resolved.

In a further aspect, the invention relates to a method for modifying a surface of an object around which a fluid flows during use, such as a foil, wherein a structure having riblets is created on and/or in the surface, which structure reduces a flow resistance of the object in the fluid. According to the invention, it is provided that, during the creation of the structure with riblets on and/or in the surface, regions having a higher wall shear stress on the profile when there is a flow around said profile are provided with riblets, and regions having a lower wall shear stress on the profile are embodied without riblets.

In this partial aspect of the invention, it is brought to bear that, according to the method, only those regions of an object need to be provided with riblets in which regions of higher wall shear stress are present on the profile when there is a flow around said profile in a fluid, whereas the remaining regions are omitted. In this case, it can be provided in particular that the wall shear stress is placed in relation to a frictional resistance, in particular a cumulative frictional resistance, as has already been explained above.

Only those partial regions of an object that are also effectively usable for a reduction of a frictional resistance during use are provided with riblets. It is consciously accepted that remaining partial regions of an object in which riblets are omitted, or are not applied, could also be minimized in terms of a frictional resistance. Though this could result in an even greater effectiveness, the technical effort and cost expenditures would drastically increase.

In those regions in which riblets are applied, the riblets can be suitably designed in terms of a wall shear stress at certain points. However, it is also possible that, effectively, a mean is taken for the riblet structure, as is disclosed in EP 2 261 117 A2, the subject matter of which is hereby expressly included. A corresponding calculation of the riblet structures in accordance with said document can be applied to all methods according to the invention.

The structure with the riblets can, in particular, be created on an upper side of the object, particularly a suction side of an airfoil for an aircraft.

The structure with riblets can be attached to the surface of the object as a film. It is also possible, as stated above, that the riblets are directly shaped on the object, or that the object is already constructed with the riblets by forming. If a film is provided, the film can be bonded to the surface. The information explained above about affixing the riblets, in particular the percentage-based distribution thereof over a longitudinal extension of an Object, apply analogously to this method variant.

Finally, the invention relates to an object around which a fluid flows during use, in particular foils, such as airfoils of an aircraft, wherein it is provided that regions of the surface of the object that have a higher wall shear stress when there is a flow around said object are provided with riblets, and regions that have a lower wall shear stress during the flowing-around are embodied without riblets.

BRIEF DESCRIPTION OF THE DRAWINGS

Furthermore, the invention is explained below in greater detail with the aid of exemplary embodiments. In the drawings which are thereby referenced:

FIG. 3 shows a schematic illustration of the flow conditions when a rough surface is affixed on the front side on an airfoil according to FIG. 1a;

FIG. 16 shows a diagram concerning a total frictional resistance over a length of the airfoil according to FIG. 1a.

DETAILED DESCRIPTION

Figure 1A:
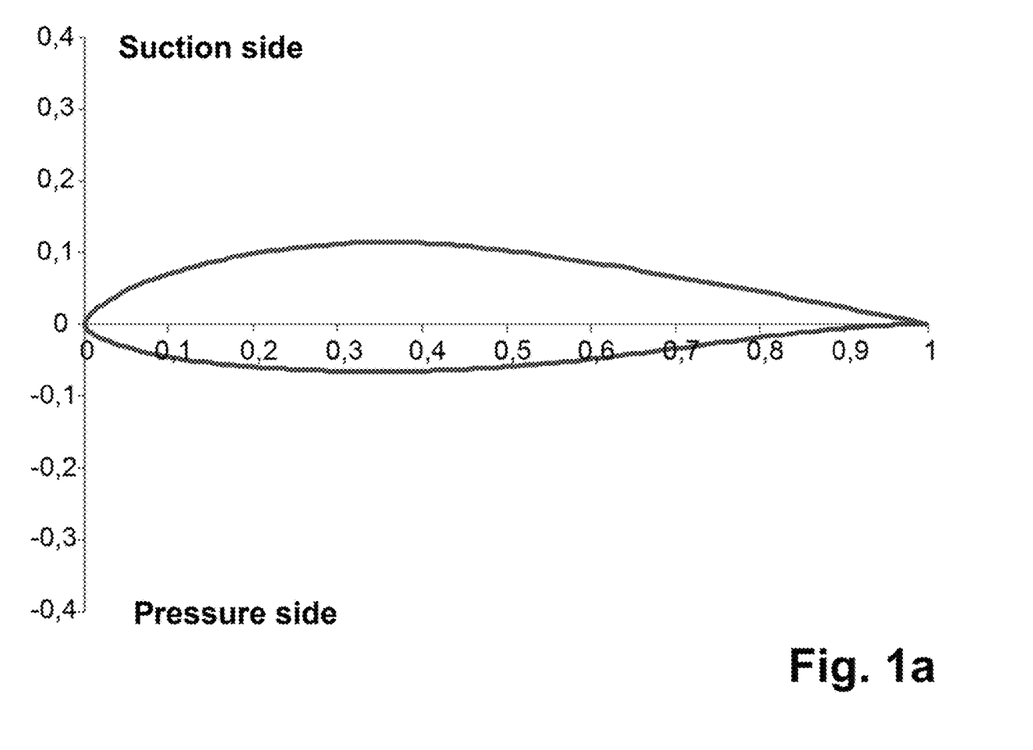
FIG. 1a shows a schematic illustration of an airfoil in cross section.

In FIG. 1a, an airfoil is illustrated in cross section. The airfoil is an asymmetrical profile. Visible in FIG. 1a are the upper suction side and the lower pressure side of the airfoil. A corresponding airfoil was used for wind tunnel tests. In practice, a transition from a laminar to a turbulent flow is present on the suction side in the range between approximately 0.4 and 0.6 on the X-axis. For the lower or pressure side, the corresponding region lies roughly in the range from 0.7 to 0.9 on the X-axis. This is illustrated by way of example in FIG. 1b.

Figure 2:
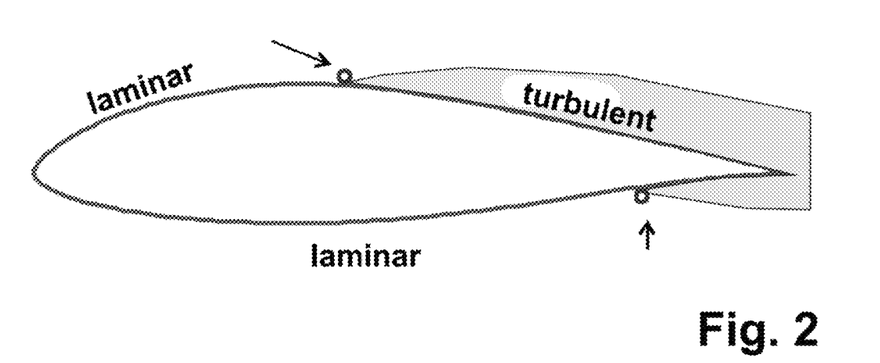
FIG. 2 shows a schematic illustration of flow conditions for an airfoil according to FIG. 1a when a wire is affixed.
Figure 3:
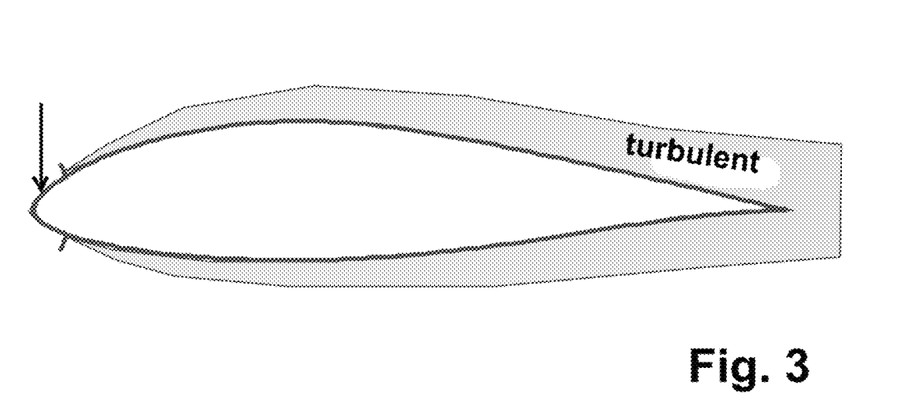

In FIG. 2 and FIG. 3, flow conditions on an airfoil according to FIG. 1a are illustrated, when disruption points are deliberately installed in order to produce a turbulent flow on the airfoil. The situation in FIG. 2, for example, simulates real conditions or transitions in which a boundary layer transition from laminar to turbulent occurs (cf. FIG. 1a). In FIG. 2, what are referred to as trip wires are affixed to the airfoil. The trip wires are indicated by an arrow. In wind tunnel tests, these trip wires result in a turbulent flow occurring on the airfoil in the regions after the trip wires. As illustrated, a trip wire can thereby be arranged both on the suction side and also on the pressure side. In both cases, it is found that the flow after the trip wire (that is, when there is a flow into the airfoil from the front in the flow direction) is turbulent. Before the trip wire, a laminar flow is present, as is also illustrated in FIG. 2.

In FIG. 3, a disruption point is likewise affixed to the airfoil, in this case, however, this is not a linear disruption point as with a trip wire, but rather a front-side region that is provided with a certain roughness. This results, when there is an inflow from the front, that is, from the left side in FIG. 3, in the presence of a turbulent flow on the airfoil along the flow direction after the disruption region with increased roughness, which region is again indicated by an arrow. A corresponding roughness can, for example, be achieved by means of an adhesive tape that has a certain roughness on the surface.

Tests were conducted in a wind tunnel with corresponding airfoils which, as will be explained below, have been modified with riblets. The testing line was 2000 mm wide, 1460 mm high, and 3200 mm long. The measuring table was positioned 1,500 mm from the leading edge.

An ambient pressure was 97000 Pa for the tests in the wind tunnel. The ambient temperature was 28° C. An with a density of 1.122 kg/m$^3$ was used as fluid. The dynamic viscosity vas 18.62·10$^{-6}$ Pas.

Figure 1B:
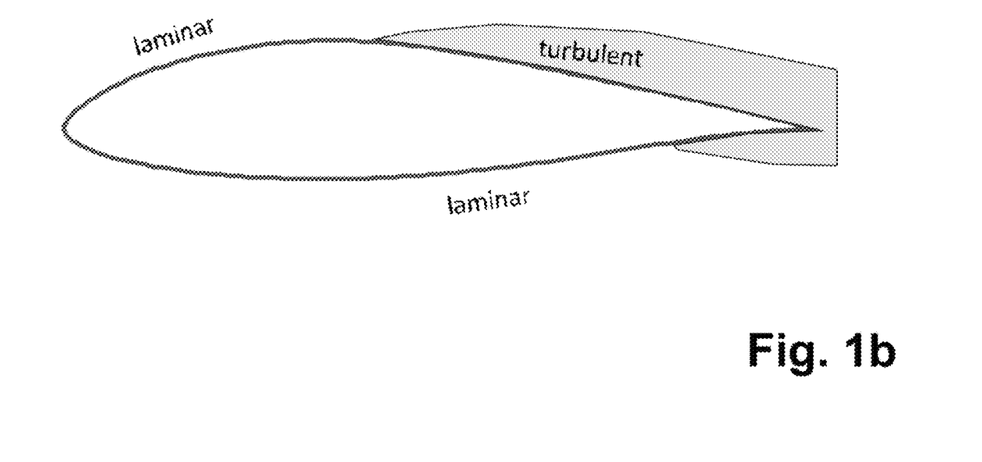
FIG. 1b shows a schematic illustration of an airfoil in cross section with a natural transition of the flowing air, or without measures.
Figure 4:
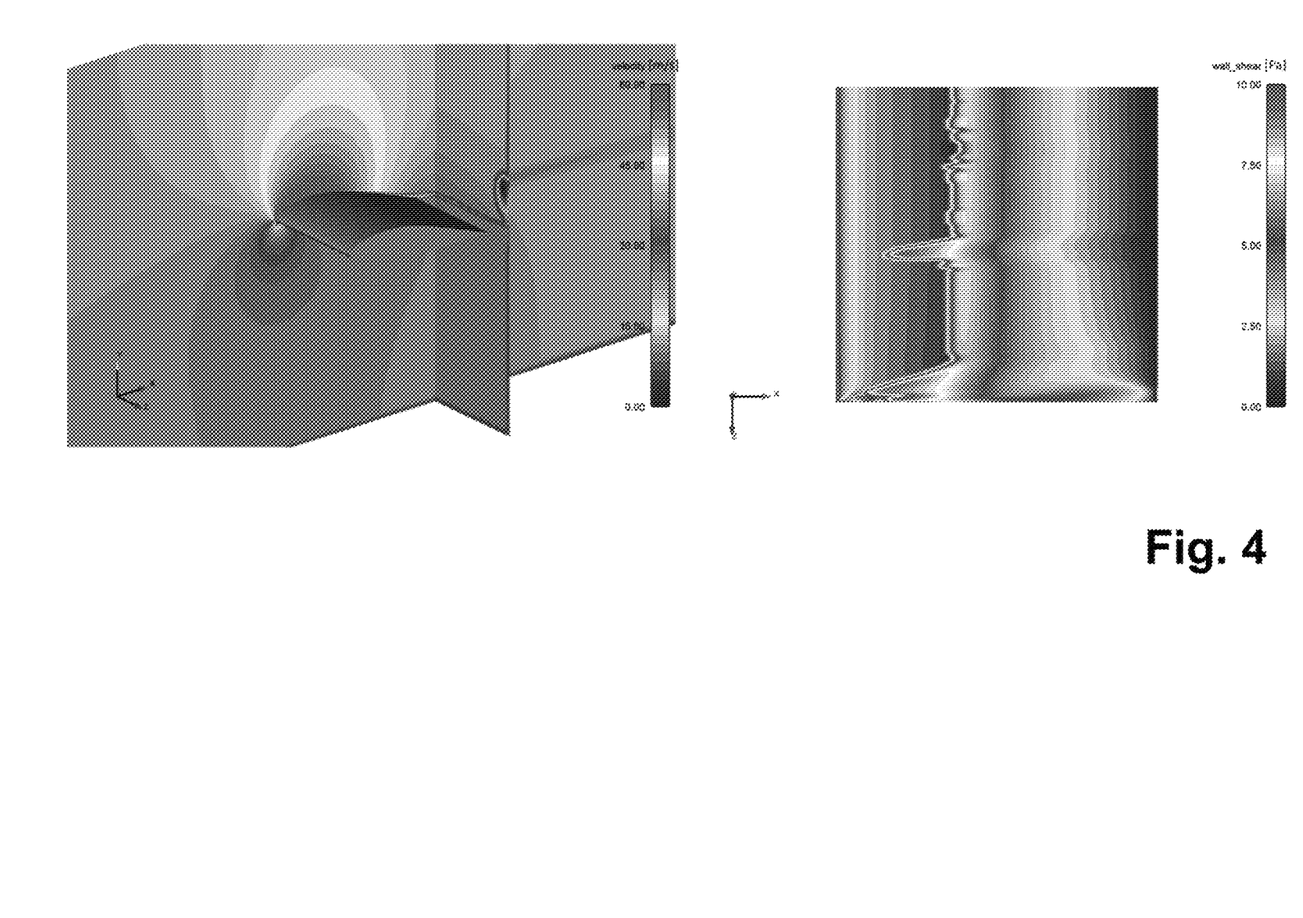
FIG. 4 shows simulation results for a wall friction (left) as well as a velocity distribution (right) for an airfoil according to FIG. 1a with an angle of attack of 8'.
Figure 5:
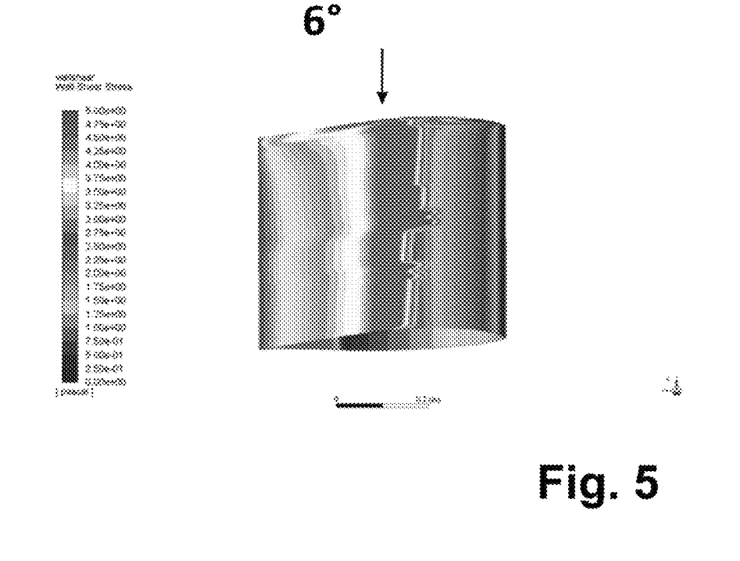
FIG. 5 through FIG. 8 show simulation results for a smooth surface of an airfoil according to FIG. 1a with different angles of attack.
Figure 6:
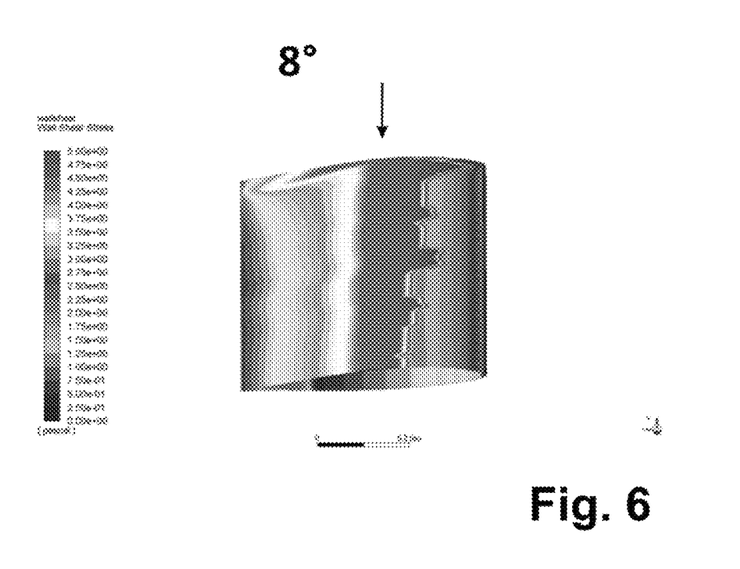
Figure 7:
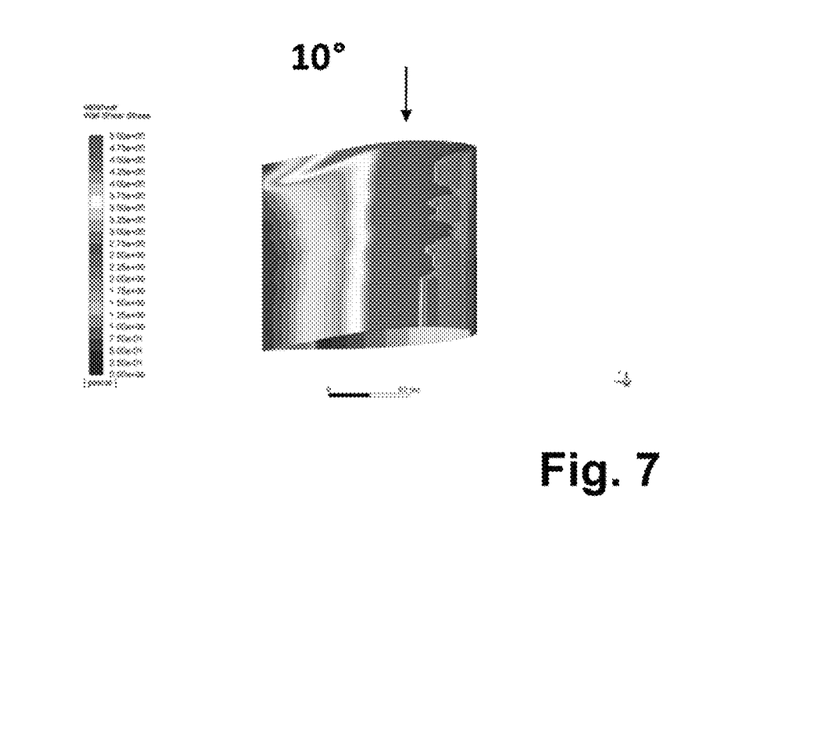
Figure 8:
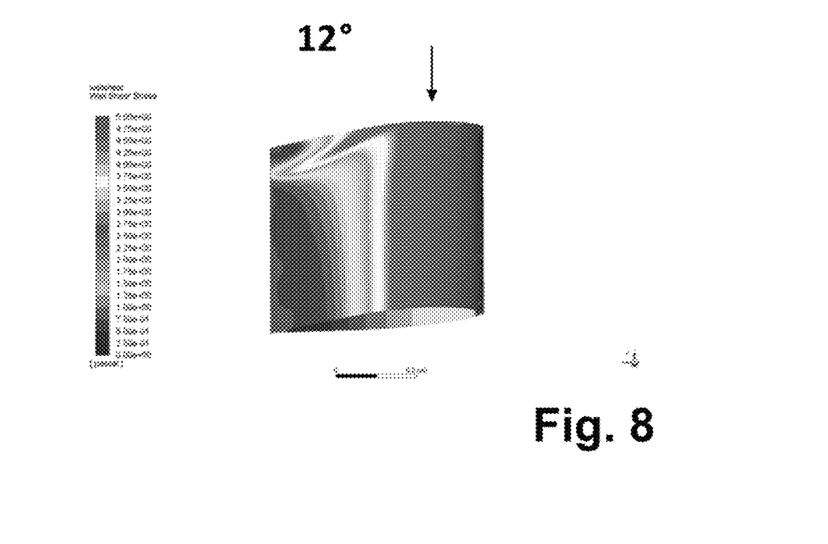

FIG. 4 shows simulation results for a smooth surface (without riblets) of an airfoil according to to FIG. 1a and FIG. 1b. In FIG. 4, the velocity distribution is shown on the left. In the region of the suction side, and there in the initial region of the airfoil, the velocity is the greatest and reaches up to approximately 60 m/s. On the right side in FIG. 4, the wall friction is depicted, with the wall shear stress on the suction side being illustrated. The corresponding simulation relates to a scenario in which the airfoil has an angle of attack of 8°.

In FIG. 5 through FIG. 8, simulation results are also depicted for a smooth surface of the same airfoil. The wall shear stress is once again indicated, which, as can be seen, depends on the angle of attack. It can likewise be seen, by reference to the succession of angles of attack from 6° (FIG. 5) up to 12° (FIG. 8) in 2° increments, that a region with particularly high wall shear stress inherently always appears, in which regions riblets could have the greatest effect. In the illustrations in FIG. 5 through FIG. 8, which have been produced in black and white, these regions correspond to those which are indicated by arrows and, in a color illustration with a scale from blue to red for low to high wall shear stress, would appear in red. The corresponding points are indicated by an arrow.

Figure 9:
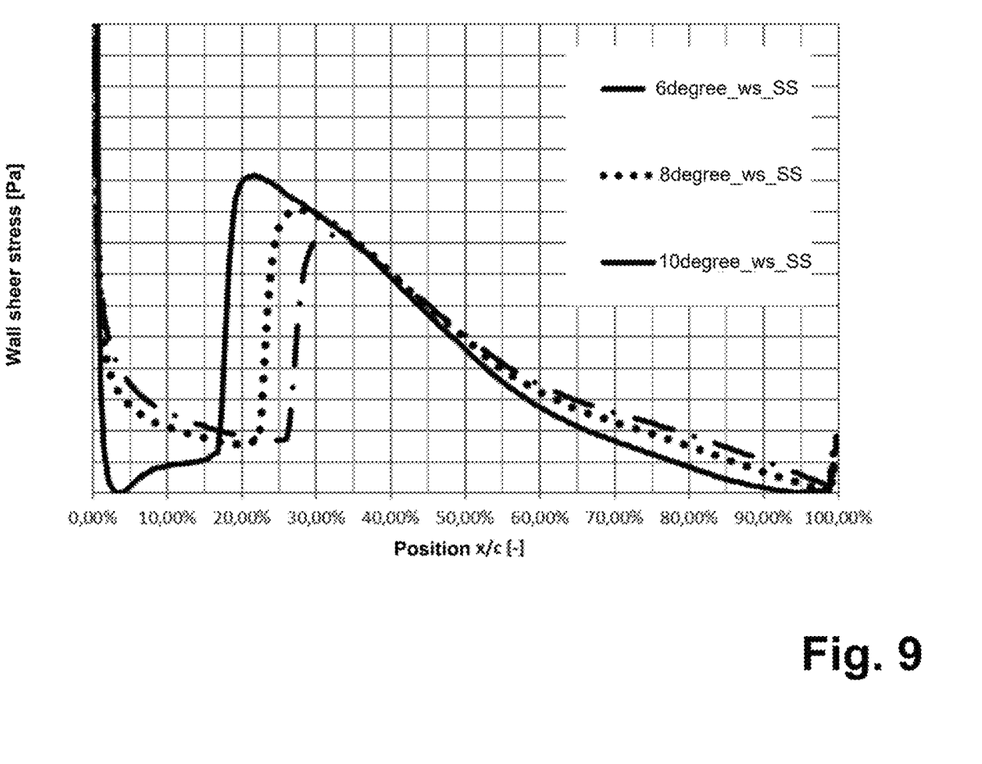
FIG. 9 shows wall friction distributions on a suction side of the airfoil according to FIG. 1a with different angles of attack.

FIG. 9, wall friction distributions are illustrated, namely for the suction side of the airfoil according to FIG. 1a and individual simulations according to FIG. 5 through FIG. 8. As can be seen, there are in all cases regions in which the wall shear stress, in relative terms, is particularly high, or in which a high wall friction exists. As the angle of attack increases, a starting point of the regions of turbulent flow moves forward, or towards a smaller longitudinal extension. Larger angles of attack thus result in greater wall friction.

If a trip wire is affixed, as is illustrated in FIG. 2, attaching riblets results in an improvement in the flow in the sense of a reduction in turbulent flow.

Figure 10:
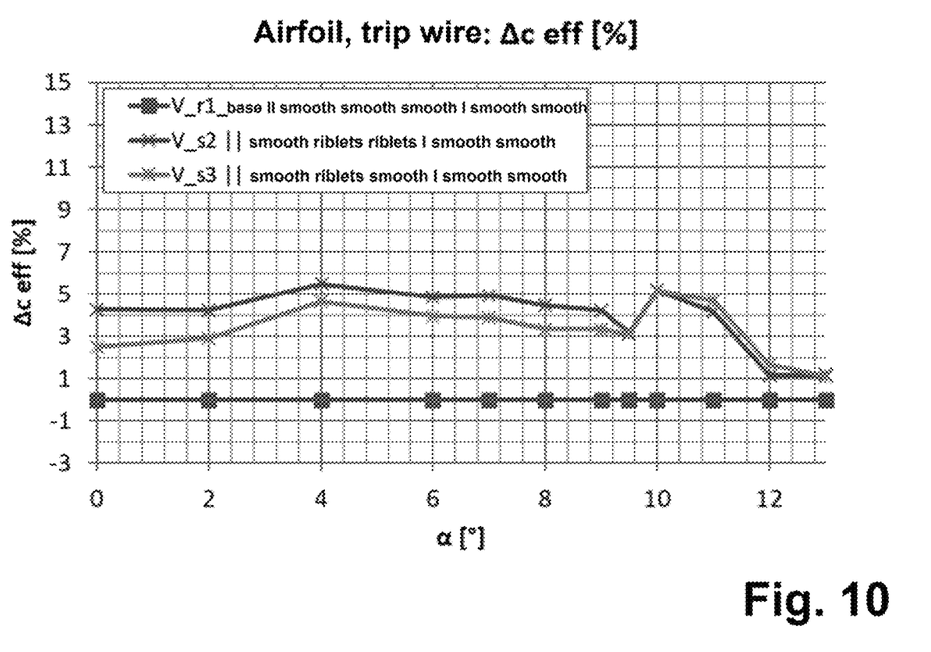
FIG. 10 shows a diagram concerning wind tunnel results when a wire is affixed according to FIG. 2, for different riblet structures.
Figure 11:
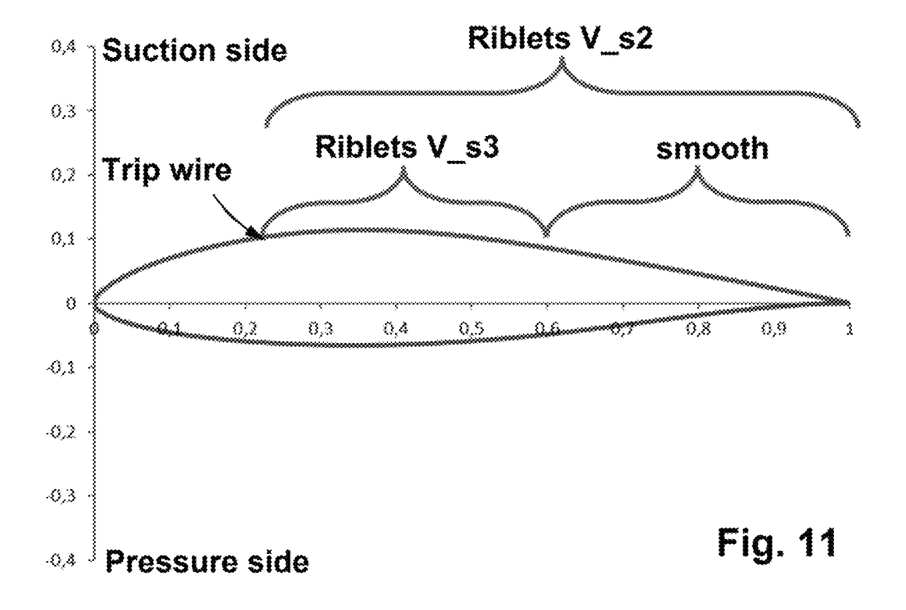
FIG. 11 shows an affixing of riblets in different regions for the diagram according to FIG. 10.

On the basis of these simulations, practical tests were conducted using profiles with and without disruption points or disruption regions according to FIG. 2 and FIG. 3. In FIG. 10, corresponding measurement results for an adapted surface according to FIG. 2 are illustrated. In FIG. 10, it can be seen that the efficiency, and therefore the ratio of lift to drag (due to the affixing of riblets) on the suction side of the airfoil according to FIG. 1a increases compared to a smooth surface. If the riblets are attached as illustrated in FIG. 11, that is, over different lengths of the airfoil, it becomes apparent that the results with riblets V_s3 according to FIG. 10 are nearly as good as the riblets V_s3. In other words: Even if the riblets V_s3 are only affixed in a much smaller partial region, namely in a range of approximately 0.2 to 0.6 of the total longitudinal extension of the airfoil (20% to 60%), a virtually equally good effect results. V_r1, an arrangement with trip wire, but without riblets, serves as a reference; due to the relative calculation ($c_{eff}$=lift force/ resistance force) and $\Delta c_{eff}$=−100+00·$c_{eff\_riblets/ceff\_smooth}$), a zero line results for this reference.

Figure 12:
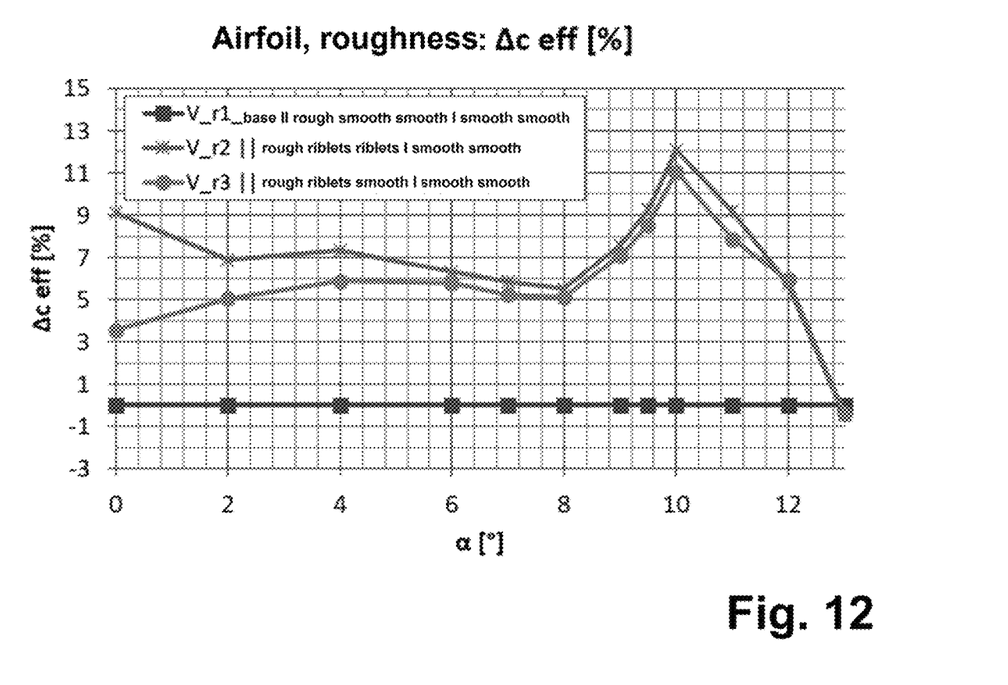
FIG. 12 shows a diagram concerning wind tunnel results when a rough surface is affixed according to FIG. 3, for different riblet structures.
Figure 13:
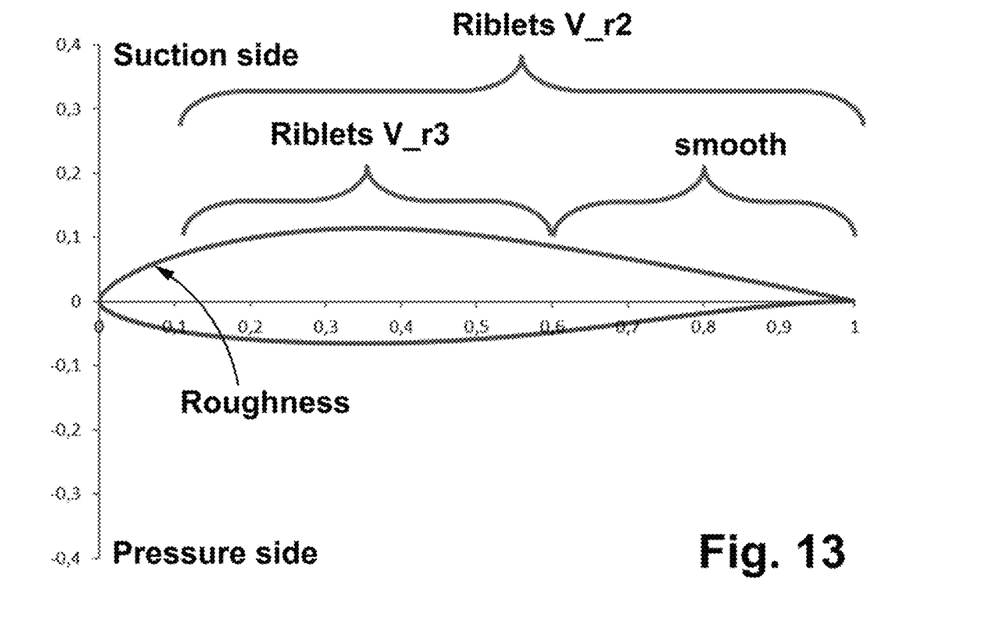
FIG. 13 shows an affixing driblets in different regions for the diagram according to FIG. 12.

In FIG. 12 and FIG. 13, analogous test results are illustrated for the arrangement according to FIG. 3, that is, the situation of a subsequent affixing of a predetermined roughness on a front side of the airfoil, into which front side a flow occurs during use and which side is located in the frontmost position in a downstream direction. In this case, it is also apparent that the resistance can be reduced by riblets, wherein the riblets V_r3 are sufficient to achieve the necessary reduction of the frictional resistance in ample regions. Taken overall, the riblets V_r2 are somewhat superior, but they also require much greater proportional coverage of the airfoil surface, and thus a significantly greater material cost. Whereas the riblets V_r3 are only arranged in a partial region (in relation to a longitudinal extension) of approximately 50%, the riblets V_r2 are arranged over nearly 90% of a chord length. V_r1 represents, like V_r1 in FIG. 10, the reference, namely the zero line, which in this case is an airfoil according to FIG. 1a equipped with the roughness on which the experiment is based, but without riblets.

Figure 14:
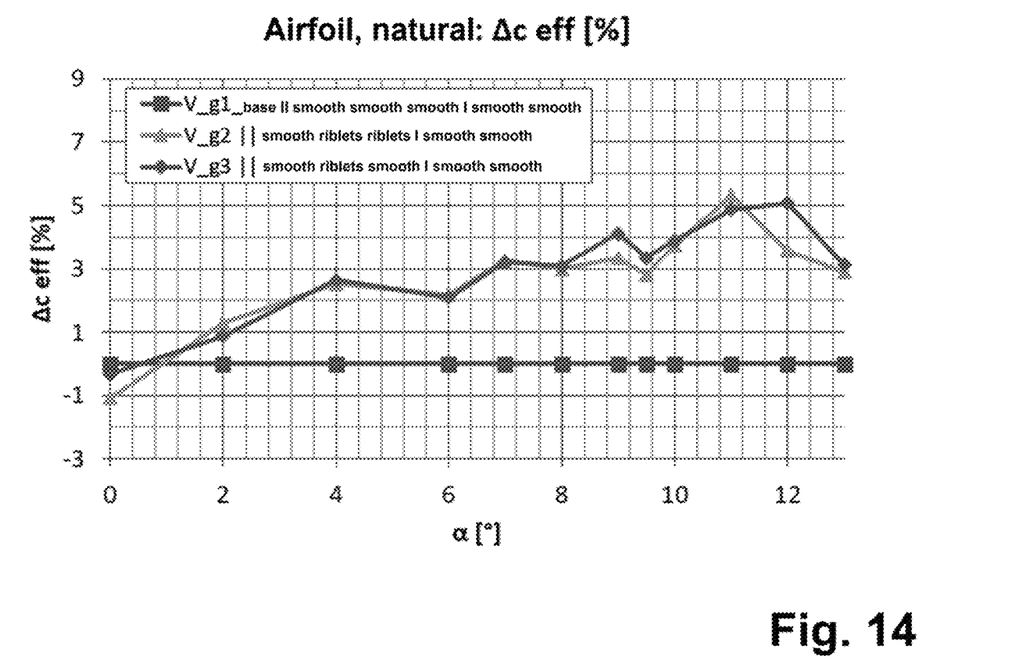
FIG. 14 shows a diagram concerning wind tunnel results for a natural transition according to FIG. 1b.
Figure 15:
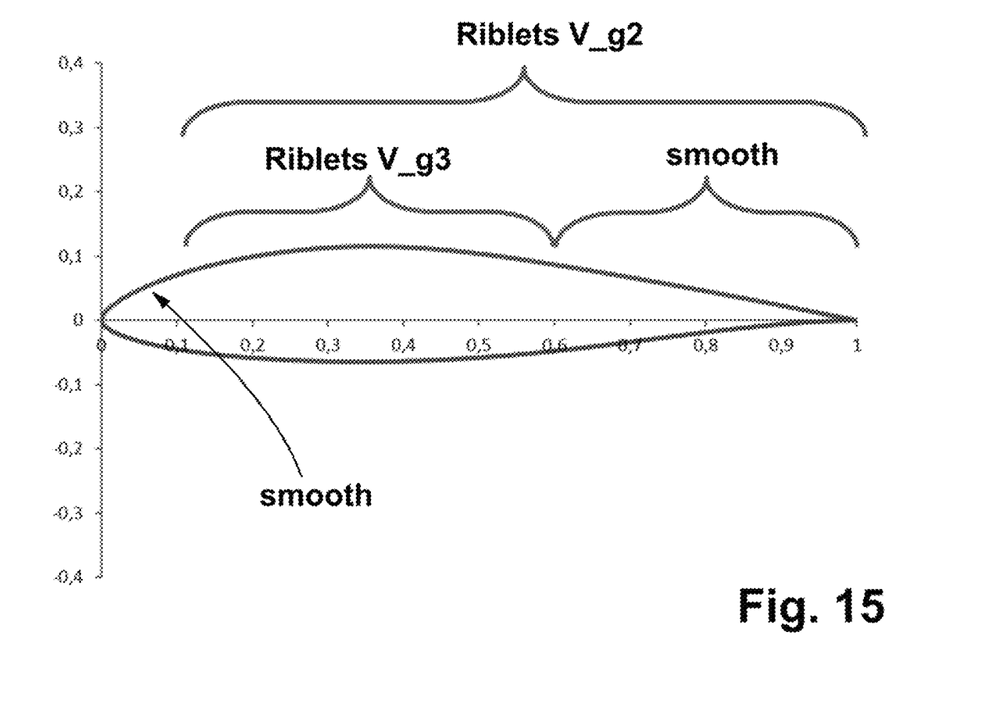
FIG. 15 shows an affixing driblets in different regions for the diagram according to FIG. 14.

In FIG. 14 and FIG. 15, corresponding results for a natural transition, that is, real conditions, are shown. As can be seen, marked increases in efficiency result even under real conditions when riblets are arranged merely in certain zones or regions. Only with very small angles of attack is there a slight loss; but as soon as angles of attack that are relevant in practice are worked with, the advantages of riblets become apparent, wherein a coverage in certain zones is already sufficient to achieve a large increase in efficiency.

Figure 16:
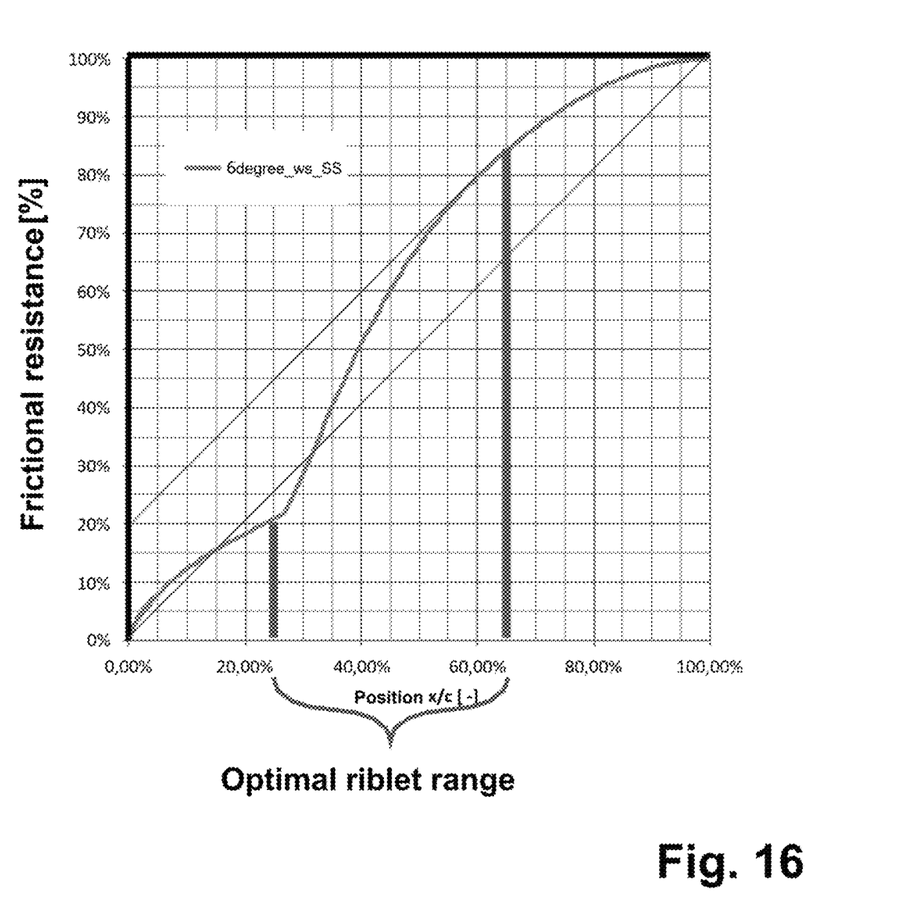

The corresponding results can be depicted very clearly, in particular on the basis of FIG. 16. As is illustrated in FIG. 16, the total frictional resistance along a longitudinal axis of an airfoil ultimately adds up to 100%. In those regions in which the frictional resistance is particularly large, a slope of >1 results for the corresponding curve of the cumulative frictional resistance. Precisely in those regions is it necessary to affix the riblets in order to achieve a greatest possible effect of the same. This can preferably take place in a continuous region until the slope reaches 0.9. Under this slope (that is, with a flat curve for the cumulative frictional resistance) it is no longer necessary to provide riblets.

Though the affixing of riblets in certain regions or zones does not necessarily need to be continuous, it is nevertheless preferred that a partial area of an airfoil or of another object is continuously covered with riblets. In the remaining regions, in which the conditions for a high effectiveness of the riblets are not present, there is an omission, or no riblets are provided. Thus, with an airfoil according to FIG. 1a, it can occur in practice that a front-side region and back-side region are embodied free of riblets, whereas riblets are provided in a middle region, namely in a continuous manner. In this case, continuous does not refer to the actual structure of the riblets, but rather to the planar region that is covered with riblets.

A method according to the invention and a correspondingly produced object are characterized in that there is a largest possible increase in efficiency with a minimized expenditure. Through a full-area coverage with riblets, it could be possible to achieve an even greater increase in efficiency, but this is counteracted by considerably larger production expenditures, in particular a significantly greater quantity of riblets or riblet structures and the necessary production thereof.

The invention claimed is:

1. A method for producing an object provided with riblets on a surface, around which object a fluid flows during use, said method comprising:
   calculating a frictional resistance acting on a surface region of the object along a flow direction during a flow around the object and added up to a cumulative frictional resistance over a length of the surface region of the object in the flow direction;
   providing the riblets on a partial region of the surface in which an increase in the cumulative frictional resistance is at least 0.9;
   wherein the cumulative frictional resistance is stated in % in relation to a total frictional resistance of 100%; and
   wherein the length is stated in % in relation to a total length.

2. A method according to claim 1, wherein:
   the providing of the riblets on the partial region of the surface in which an increase in the cumulative frictional resistance is at least 0.9 and up to 1.0.

3. A method according to claim 1, wherein:
   the frictional resistance acting along the flow direction is calculated at certain points.

4. A method according to claim 1, wherein:
   the frictional resistance acting along the flow direction is calculated at multiple points in a plane transverse to the flow direction, including points lying along a straight line in the plane transverse to the flow direction, after which the cumulative frictional resistance is added up from the frictional resistances calculated in such a manner.

5. A method according to claim 1, wherein:
   a region of the surface beginning downstream remains disregarded in the calculation.

6. A method according to claim 5, wherein:
   the region of the surface beginning downstream accounts for maximally 20%.

7. A method according to claim 5, wherein:
   the region of the surface beginning downstream accounts for maximally 15%.

8. A method according to claim 5, wherein:
   the region of the surface beginning downstream accounts for maximally 10%.

9. A method according to claim 1, wherein:
   the riblets are provided in a range of 20% to 90% of a longitudinal extension of the surface in the flow direction.

10. A method according to claim 1, wherein:
    the riblets are provided in a range of 25% to 85% of a longitudinal extension of the surface in the flow direction.

11. A method according to claim 1, wherein:
    the riblets are provided in a range of 30% to 80% of a longitudinal extension of the surface in the flow direction.

12. A method according to claim 1, wherein:
    the riblets are provided only in a single partial region of the surface.

13. A method according to claim 1, wherein:
    the object is a foil; and
    the riblets are provided directly or indirectly on the foil.

14. A method according to claim 1, wherein:
    a bendable film is used as the object.

15. A method according to claim 1, wherein:
    a foil is used as the object.

16. A method according to claim 1, wherein:
    the riblets are provided only in the partial region of the surface.

17. A method for modifying a surface of an object around which object provided with riblets on a surface, around which object a fluid flows during use, said method comprising:
    creating a structure having riblets on the surface, said structure being configured to reduce a flow resistance of the object;
    wherein, during the creating of the structure with riblets on the surface, regions having a higher wall shear stress on a profile when there is a flow around the profile are provided with riblets, and regions having a lower wall shear stress on the profile are embodied without riblets;
    placing a wall shear stress in relation to a cumulative frictional resistance, and wherein the riblets are provided on a partial region of the surface in which an increase in a cumulative frictional resistance is at least 0.9;
    calculating a frictional resistance acting on a surface region along a flow direction during a flow around the object in a fluid is added up to the cumulative frictional resistance over a length of the surface region in the flow direction;
    wherein the cumulative frictional resistance is stated in % in relation to the total frictional resistance of 100%; and
    the length is stated in % in relation to a total length.

18. A method according to claim 17, wherein:
    the riblets provided on a partial region of the surface in which an increase in a cumulative frictional resistance is at least 0.9 and up to 1.0.

19. A method according to claim 17, wherein:
    the structure with riblets is created on an upper side of the profile, in a suction side of an airfoil for an aircraft.

20. A method according to claim 17, wherein:
    the structure having riblets on the surface is bonded to the object as a film.

21. An object, obtainable according to claim 1, wherein:
    the riblets are provided only in the partial region of the surface.

* * * * *